United States Patent

Karaaslan et al.

Patent Number: 6,023,145
Date of Patent: Feb. 8, 2000

[54] HEAD AND DISK TESTER WITH A THERMAL DRIFT-COMPENSATED CLOSED-LOOP POSITIONING SYSTEM

[75] Inventors: Ufuk Karaaslan, Sunnyvale; Ilia Bokchtein, Santa Clara; Anatoli Stein, Los Altos; Nahum Guzik; Alexander Varlakhanov, both of Palo Alto, all of Calif.

[73] Assignee: Guzik Technical Enterprises, San Jose, Calif.

[21] Appl. No.: 09/295,912

[22] Filed: Apr. 21, 1999

[51] Int. Cl.[7] .......................................... G11B 5/58
[52] U.S. Cl. ..................... 318/652; 360/78.13; 369/53; 318/634
[58] Field of Search ..................... 318/565, 632, 318/634, 652, 671, 685; 360/31, 75, 78.12, 78.13, 105; 369/43, 53, 176, 215, 219, 223

[56] References Cited

U.S. PATENT DOCUMENTS

| | | | |
|---|---|---|---|
| 4,788,608 | 11/1988 | Tsujisawa | 360/77.04 |
| 5,268,800 | 12/1993 | Nielsen | 360/77.01 |
| 5,382,887 | 1/1995 | Guzik et al. | 318/652 |
| 5,479,388 | 12/1995 | Gondou et al. | 369/47 |
| 5,867,341 | 2/1999 | Volz et al. | 360/77.08 |

*Primary Examiner*—Bentsu Ro
*Attorney, Agent, or Firm*—Lappin & Kusmer LLP

[57] ABSTRACT

The head/disk tester of the invention has a housing 43 that houses spindle 44 that rotatingly supports a magnetic disk 31. The housing supports a moveable carriage 30 that, in turn, supports a magnetic head 32. Positioning means 39 and 41 are used to move the carriage and the magnetic head across the magnetic disk. These positioning means include stepper motors that realize coarse positioning of the magnetic head, and a piezo actuator 37 that is used for fine positioning. Linear encoders 40 and 42 located at both sides of the carriage provide feedback information to a closed-loop positioning system that controls the piezo actuator. A set of special signals ("servo bursts") pre-written at a given track of the magnetic disk is used as an additional source of feedback information for the same closed-loop positioning system. This positioning system includes a servo analyzer 45 that reads and processes servo burst signals from the magnetic disk, and a position controller 49 that controls the piezo actuator. The controller contains two control loops: a proportional-integral-derivative (PID) loop and an additional servo burst loop. During any movement of the magnetic head to a prescribed command position, the servo burst feedback is turned off, and feedback from linear encoders is used by the PID loop to move the head. When the magnetic head reaches the prescribed command position, servo burst loop is turned on; it changes the command position of the PID loop in a way to keep the ratio of pre-written burst signals constant. As a result, the position of the magnetic head with respect to the data track remains the same for as long as necessary, even in unstable temperature conditions.

19 Claims, 6 Drawing Sheets

HEAD AND DISK TESTER WITH A THERMAL DRIFT-COMPENSATED CLOSED-LOOP POSITIONING SYSTEM

FIELD OF THE INVENTION

The present invention relates to magnetic head/disk testers, in particular, to testers of the aforementioned type with a closed-loop positioning system and to a method for eliminating thermal drift of magnetic head position in such testers.

BACKGROUND OF THE INVENTION

High-capacity computer storage devices typically include one or more electromagnetic transducers and a corresponding number of magnetic media disks. The transducers, also known in the art as "heads", are adapted for transfer of electronic information between a data source, for example a computer, and data locations on the magnetic disks. Information is communicated in accordance with well-known conventions and formats that enable high-density storage, rapid access to data locations, high reliability, data integrity, and device miniaturization, writing and reading of data is accomplished with a read/write head positioned over a disk.

In general, information is stored on and read from disks in "tracks", which are regions of width T which extend along a plurality of concentric circular track center lines disposed about a disk axis. There are inter-track regions which are not used for storage of data. In some prior art disks, relatively high frequency "servo burst" signals are written in the intertrack regions, for use in maintaining a read/write head on or near the track center line, so that optimal reading and writing can be effected.

Figure 1:
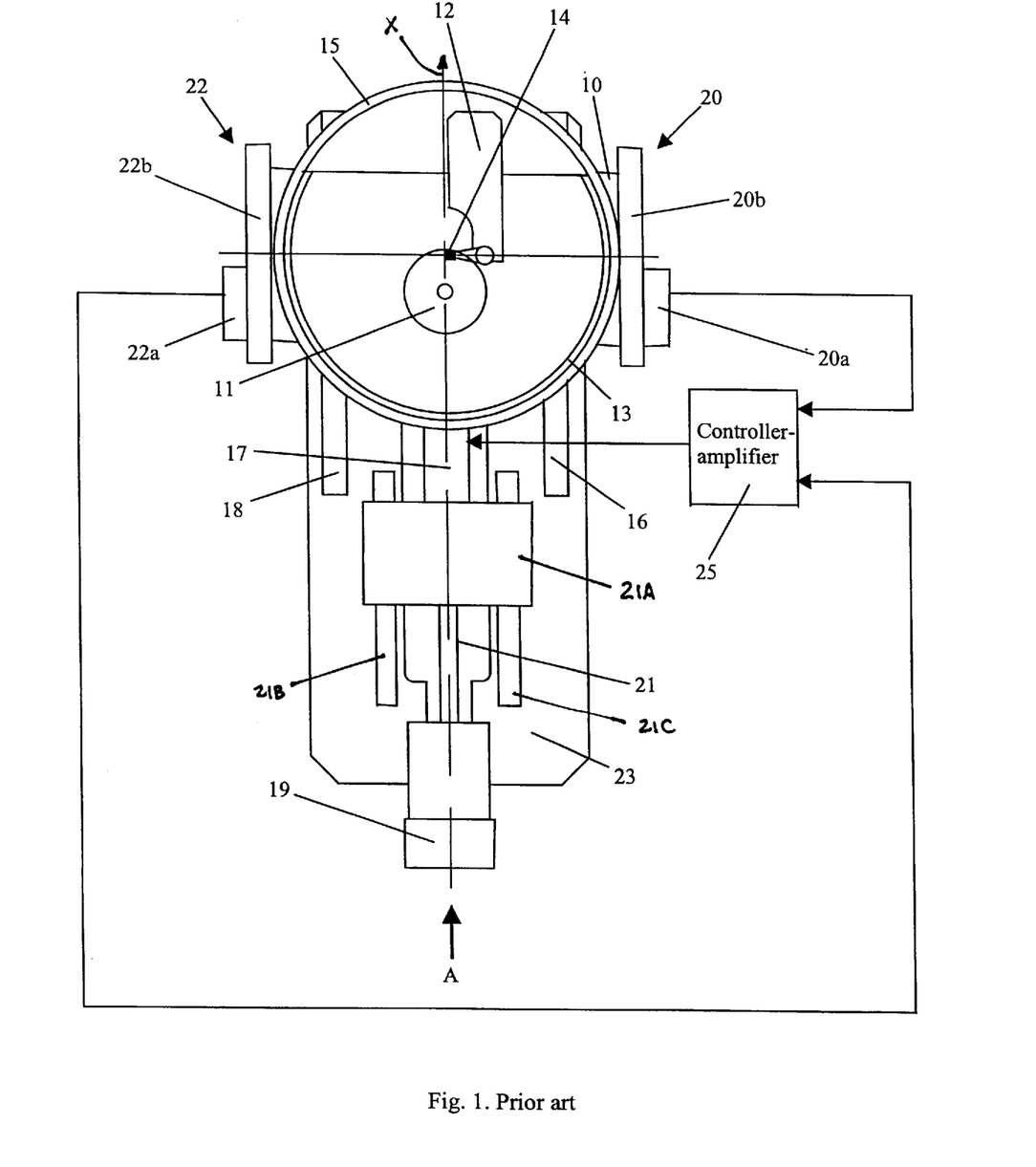
FIG. 1 is a schematic top view of a prior art head/disk tester.

In the manufacture of a disk-based storage system, known as a "disk-drive", magnetic heads are usually tested on special magnetic head/disk testers with regard to their parameters and performance characteristics. An example of a prior-art head/disk tester (U.S. Pat. No. 5,382,887) is shown in FIG. 1, a schematic top view of the tester. In that figure, the tester has a carriage 10 that is shown in reference to a horizontal X–Y coordinate system affixed thereto. Carriage 10 is slidable along horizontal bottom rails 16 and 18 mounted on a base 23 and extending along the X axis. Carriage 10 houses an outer ring 15 affixed thereto that supports an inner ring 13. Inner ring 13 is rotatable about a vertical (Z) axis extending from the centrally located (with respect to ring 15) intersection of the X and Y axes. Ring 13 carries a magnetic head support 12 with a magnetic head 14 to be tested.

The magnetic head 14 is located in the center of the rings 13 and 15. A magnetic disk support (not shown) extends vertically from base 23 and provides support for a magnetic disk 11 in a horizontal plane, with disk 11 being rotatable about a vertical spin axis. As carriage 10 slides along rails 16 and 18, in the direction of the X axis, the magnetic head 14 moves across the magnetic disk 11 in the directions indicated by arrow A. A stepper motor (not shown) selectively rotates inner ring 13 (about the Z axis) with respect to outer ring 15 and carriage 10. A stepper motor 19 affixed to base 23, rotationally drives a lead screw 21 which is coupled to an intermediate block 21A which is slidable in the X direction along rails 21B and 21C. The intermediate block 21A is coupled to carriage 10 by a piezo actuator 17. With this configuration, the position of carriage 10 (and thus head 14) along the X axis is controlled in a course manner by motor 19, lead screw 21 and block 21A. The relative position of carriage 10 with respect to block 21A about the axis is controlled in a fine manner by piezo actuator 17.

Linear encoders 20 and 22 are disposed in opposite sides of carriage 10, parallel to the direction of the carriage movement and symmetrical with respect to the centerline of the carriage 10. Each encoder consists of two portions: a stationary portion, namely, parts 20a and 22a that are attached to base 23, and a movable portion, namely, parts 20b and 22b, that are attached to outer ring 15. In one form, the current position of the head 14 is defined by arithmetic mean of readouts of the encoders 20 and 22.

The difference between the desired position and a current position of the head 14 is determined by a controller-amplifier 25, which provides a feedback control signal that is applied to the piezo actuator 17. In response to that signal, the piezo actuator 17 adjusts its dimension in the X direction. As a result, the carriage 10 moves in order to locate the head 14 to the desired position.

When the room temperature changes during testing, all parts of the head/disk tester, in particular, the carriage 10, the magnetic head holder 12, and the magnetic head 14, change their dimensions due to thermal expansion or contraction. These dimensional changes are not the same for different parts of the head/disk tester because of the differences in thermal expansion coefficients of the various parts. Moreover, the rate of temperature change is not the same for different parts due to differences in their heat transmission and storage characteristics. As a result, arithmetic mean of readouts of the encoders 20 and 22 does not reflect the true location of the head 14 under conditions of changing temperature.

Even when the room temperature is constant, different parts of the head/disk tester heat up differently depending on their respective proximities to heat sources in the tester (e.g., motors). Further, the dimensions of the magnetic disk 11 also change when the temperature changes. As a result, the location of the magnetic head 14 with respect to the magnetic disk 11 is not predictable in the case of a temperature change.

OBJECTS OF THE INVENTION

It is an object of the present invention to provide a head/disk tester that effects accurate positioning of a magnetic head with respect to magnetic disk in a tester, even in the case of unstable temperature conditions. Another object of the invention is to provide a method of positioning that eliminates the temperature drift of the magnetic head position in such head/disk testers. One more object is to provide a head/disk tester that ensures positioning repeatability, for example, on the order of 0.0025 $\mu$m (0.1 $\mu$in) during any test, regardless of how long it takes.

SUMMARY OF THE INVENTION

According to the present invention, a head/disk tester comprises a thermal-drift compensated closed-loop positioning system that uses two sources of positioning feedback. The first source, linear encoders, reflects the position of a magnetic head with respect to the magnetic disk in the absence of thermal drift. The working range of the first source is relatively wide and covers the whole magnetic disk; this source is used to move the magnetic head from one location to another. The second source, servo burst signals on the disk under test, reflects the position of the magnetic head with respect to the magnetic disk in any temperature condition. Working range of the second source is relatively narrow and covers a vicinity of a track of the magnetic disk; this source is used in order to keep the magnetic head at a prescribed location.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENT OF THE INVENTION

Figure 2:
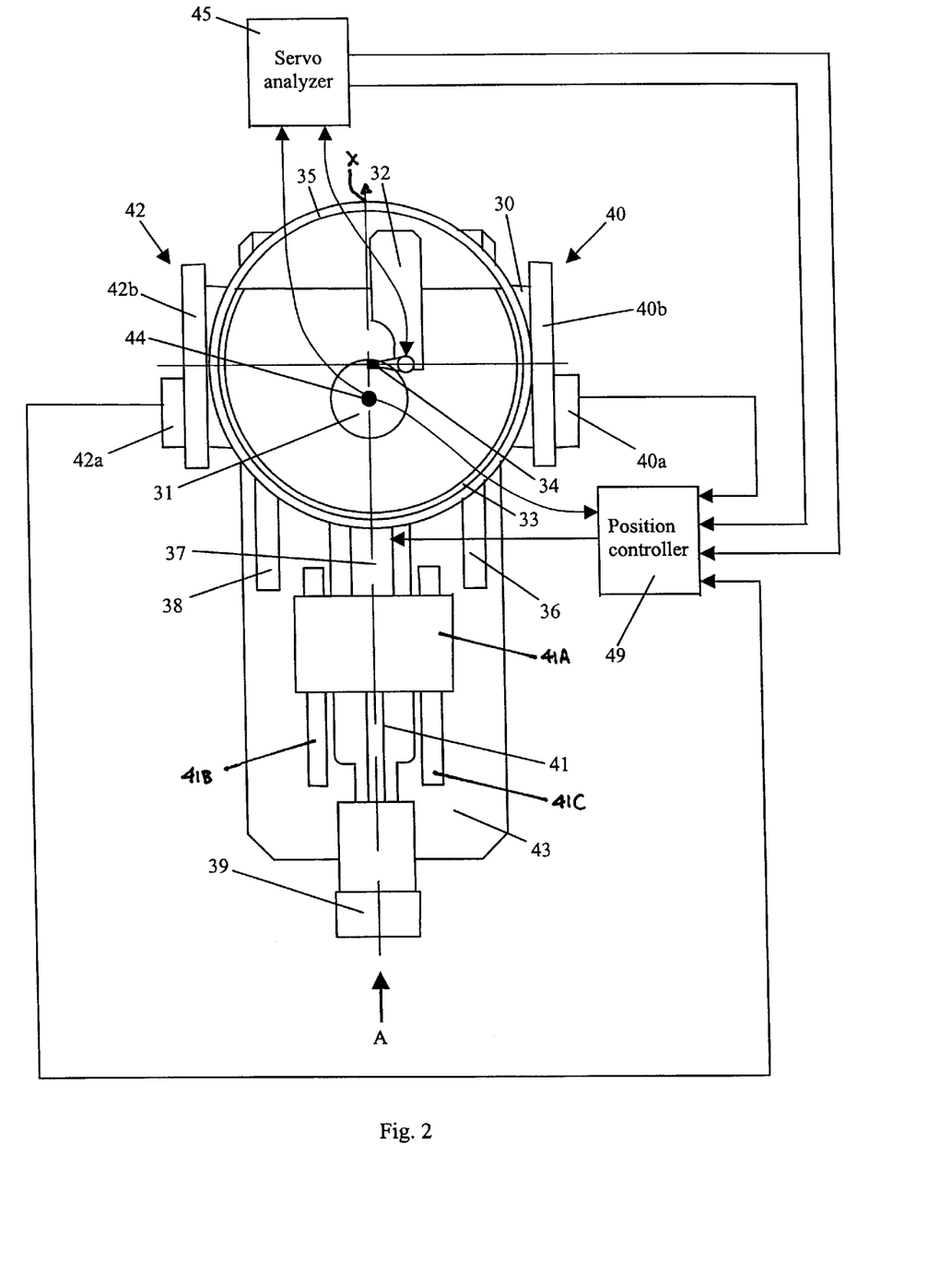
FIG. 2 is a schematic top view of a tester of the invention.

An exemplary head/disk tester of the invention, with a thermal drift-compensated closed-loop positioning system, is schematically shown in FIG. 2. Similar in many respects to the prior art head/disk tester of FIG. 1, the head/disk tester of FIG. 2 has a base 43 that supports a carriage 30 guided along horizontal (X-axis) rails 36 and 38 in the direction of arrow A. Carriage 30 supports an outer ring 35 that in turn supports an inner ring 33, centered about the intersection of the X and Y axes of a horizontal coordinate system on carriage 30. The inner ring 33 carries a magnetic head support 32 with a magnetic head 34 to be tested. The carriage 30 is driven linearly in the direction indicated by arrow A by a stepper motor 39 through a lead screw 41 coupled to an intermediate block 41A (slidable in the X direction on horizontal rails 41B and 41C). Carriage 30 in turn is driven with respect to block 21A in the X-direction by a piezo actuator 37. Another stepper motor (not shown) is used to rotate the inner ring 33, the -magnetic head support 32, and the magnetic head 34 (about the Z axis) with respect to the outer ring 35 and carriage 30.

Linear encoders 40 and 42 are disposed on opposite sides of the carriage 30. Each encoder consists of two portions: a stationary portion, namely, parts 40a and 42a that are attached to a base 43, and a movable portion, namely parts 40b and 42b that are attached to outer ring 35. The current position of the head 34 (and its read/write gap) is defined by readouts of the encoders 40 and 42.

Also mounted on the base 43 is a spindle 44 that can rotate a magnetic disk 31 about a vertical axis. An optical encoder (not shown) of the spindle 44 generates a sequence of sector pulses that corresponds to the angular position of the magnetic disk 31.

A head/disk tester as described so far is similar to the Model S1701 Spinstand used in conjunction with the Model 2550 Read-Write Analyzer, produced by Guzik Technical Enterprises, San Jose, Calif..

A distinguishing feature of the head/disk tester of the invention is that the tester is equipped with a positioning system that ensures accurate positioning of the magnetic head 34 with respect to the magnetic disk 31 in the presence of a temperature drift.

That positioning system includes a servo analyzer 45 and a position controller 49. One of the inputs of the servo analyzer 45 is connected to the read signal output of the magnetic head 34. The spindle encoder applies a sequence of sector pulses to another input of the servo analyzer 45. One output of the servo analyzer 45 is connected to the write element of the magnetic head 34.

Two inputs of the position controller 49 are connected to the outputs of the linear encoders 40 and 42; two other inputs of the position controller 49 are connected to the servo burst amplitude outputs of the servo analyzer 45. The sequence of sector pulses is applied to another input of the position controller 49. The output of the position controller 49 is electrically connected to the piezo actuator 37.

The positioning system of the invention uses a set of special signals (so-called "servo bursts") which are written at different spatial (radial) offsets with respect to the center of a data track on a magnetic disk. Alternatively, the system may be adapted for disks with servo bursts pre-written thereon; in such forms of the invention, the servo burst write operation is not needed.

Servo bursts written on the disk are also separated in the circumferential direction from a data track. As a consequence, as a disk rotates past a radially extending reference axis, the spatial position of servo bursts and a data track can be expressed as a function of time (which corresponds to the rotation of the disk). An example of the servo burst and data track viewed in this manner is shown in FIG. 3.

Figure 3:
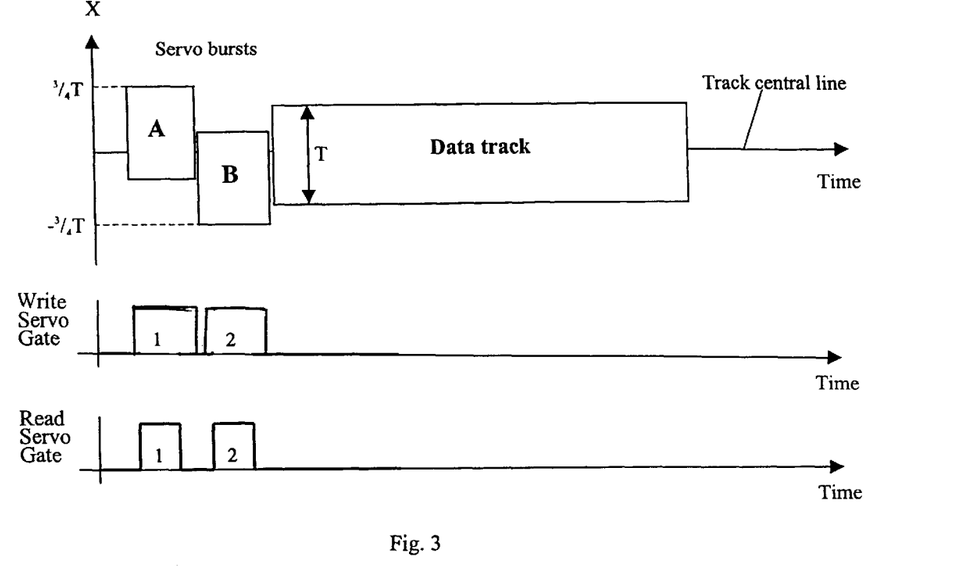
FIG. 3 is a timing diagram of the servo burst signals and data signals read from the magnetic disk, and a timing diagram of the write servo gate signal and the read servo gate signal.

The upper portion of FIG. 3 shows for a data track on a magnetic disk, the locus of servo and data signals that are written as a function of time and physical location along the track. The data track location is centered about a track center line (TCL). The signals written to the disk by the write portion of a magnetic head have a width T in a direction transverse to the TCL. As illustrated in FIG. 3, two servo bursts, denoted A and B, are first written in sequence to the disk, where burst A is offset (radially) by the distance T/4 to one side of the TCL, and burst B is offset (radially) by the distance T/4 to the other side of the TCL. Following bursts A and B, i.e. circumferentially offset from servo signals, data is, or can be, written to the data track which is centered about the TCL. The center and lower portions of FIG. 3 illustrate a write servo gate signal and a read servo gate signal, respectively, which are binary signals, having a first state at times corresponding to the writing and reading respectively of the burst signals A and B, and having a second state at other times. The read gate signal pulses are shown to be centered within the write gate signal pulses, for optimal performance.

In operation, a read portion of the head is used to generate a signal representative of the information written along a track. If the read portion of the magnetic head is positioned symmetrically about the TCL, its output signal is optimized for information on the data track. If the read portion of the magnetic head is positioned transverse to the TCL in the direction of arrow X in FIG. 3 (positive offset), the detected amplitude due to servo burst A increases, and the amplitude due to servo burst B decreases, since compared to the amplitude when read along the TCL, read portion of the head produces an output signal having an amplitude corresponding to the stored signal immediately underlying that head. If the read portion of the magnetic head is positioned in the direction opposite to arrow X (negative offset), the amplitude due to servo burst A decreases, and the amplitude due to servo burst B increases, compared to the amplitude when read along the TCL. At a given offset, the ratio of the amplitude of the signal from reading servo burst A to the amplitude of the signal from reading servo burst B is constant.

In the prior art, servo bursts are used in systems as an aid in positioning a head with respect to a data track, for example, in commercial hard drives which move a read/write head to the center of a track and to keep it there. However, unlike commercial hard drives that are only required to position the head to the center of a track, a head/disk tester is required to repeatably move a magnetic head to different offsets from the track center in order to perform measurements at the respective offsets. Establishment of high accurate offset positions of the head, on a repeatable basis, is quite important in a system for testing heads. Since head parameters and detected servo bursts amplitude change from head to head, these offset positions can not be determined using servo information alone.

In order to solve these problems and provide accurate and repeatable offset for a head, the present invention uses two sources of feedback for head positioning operations. One source is a set of linear encoders, which senses the position of carriage 30 with respect to base 43, and the second source is the servo burst information read from the magnetic head, which represents the actual position of the head with respect to a track center line. The first source, the linear encoders, is used to move the magnetic head from one position to another one over the disk, e.g., from one track to another. The second source, servo burst information, is used in order to keep the magnetic head in a particular radially offset position relative to the track center line.

According to the preferred embodiment of the present invention, servo bursts A and B are high frequency signals. Before testing starts, those servo bursts are written in the beginning of each sector, immediately before the data track, as illustrated in the upper portion of FIG. 3. As shown in that figure, servo burst A is written at an offset equal to ¼ the write-width of the head. Servo burst B is written at an offset equal to −¼ the write-width of the head. Other offsets might be used in other embodiments.

Figure 4:
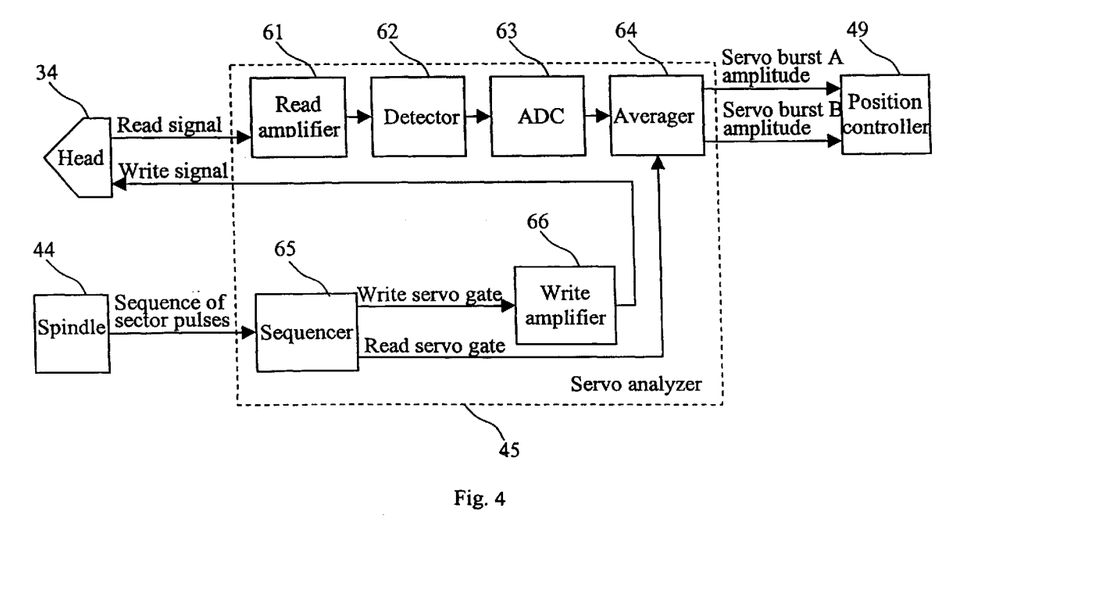
FIG. 4 is a functional block diagram of the servo analyzer.

FIG. 4 shows a servo analyzer 45 in block diagram form, which processes the information from the two feedback sources. As illustrated in that figure, servo analyzer 45 includes a sequencer 65 which receives an input signal from the encoder of spindle 44. The sequencer 65 is coupled by way of a write amplifier 66 to a write element of magnetic head 34. A read element of magnetic head 34 is coupled to a read amplifier 61, which is coupled in sequence to a detector 62, analog-to-digital converter (ADC) 63, averager 64, and finally to a position controller 49. That averager 64 is gated by a signal from sequencer 65.

In operation, servo write and read operations are performed by the servo analyzer 45. The spindle 44 generates a sequence of sector pulses at uniform time intervals as the spindle rotates disk 31. These pulses are applied to the sequencer 65, which generates two control signals, "write servo gate", and "read servo gate". Write servo gate is used to enable the write amplifier 66 that drives the write element of the head 34 in order to write the servo bursts shown in FIG. 3, upper portion.

The read element of head 34 generates a read signal which is amplified by read amplifier 61 of the servo analyzer 45. Detector 62 filters the amplified read signal using a high quality band-pass filter centered on the relatively high frequency of the servo bursts and produces a signal representative of the envelope of the read signal. This envelope signal is sampled and digitized by sampling analog-to-digital converter (ADC) 63. The digital values from ADC 63 are averaged in averager 64 to provide statistical estimates of the servo burst amplitudes. Averager 64 is synchronized with the servo bursts by way of the read servo gate output of sequencer 65. As shown in FIG. 3, lower portion, read servo gate is high only when the envelope data from a servo burst is valid. During the first pulse of the read servo gate, averager 64 averages the sampled values of servo burst A envelope. During the second pulse, averager 64 averages the sampled values of servo burst B envelope. Following the occurrence of the two high states of the read servo gate, averager 64 provides signals representative of the respective averaged values of the detected amplitudes of servo bursts A and B at the outputs of servo analyzer 45. These output signals are applied to the position controller 49 for head 34, for example, of the type shown in FIG. 5.

Figure 5:
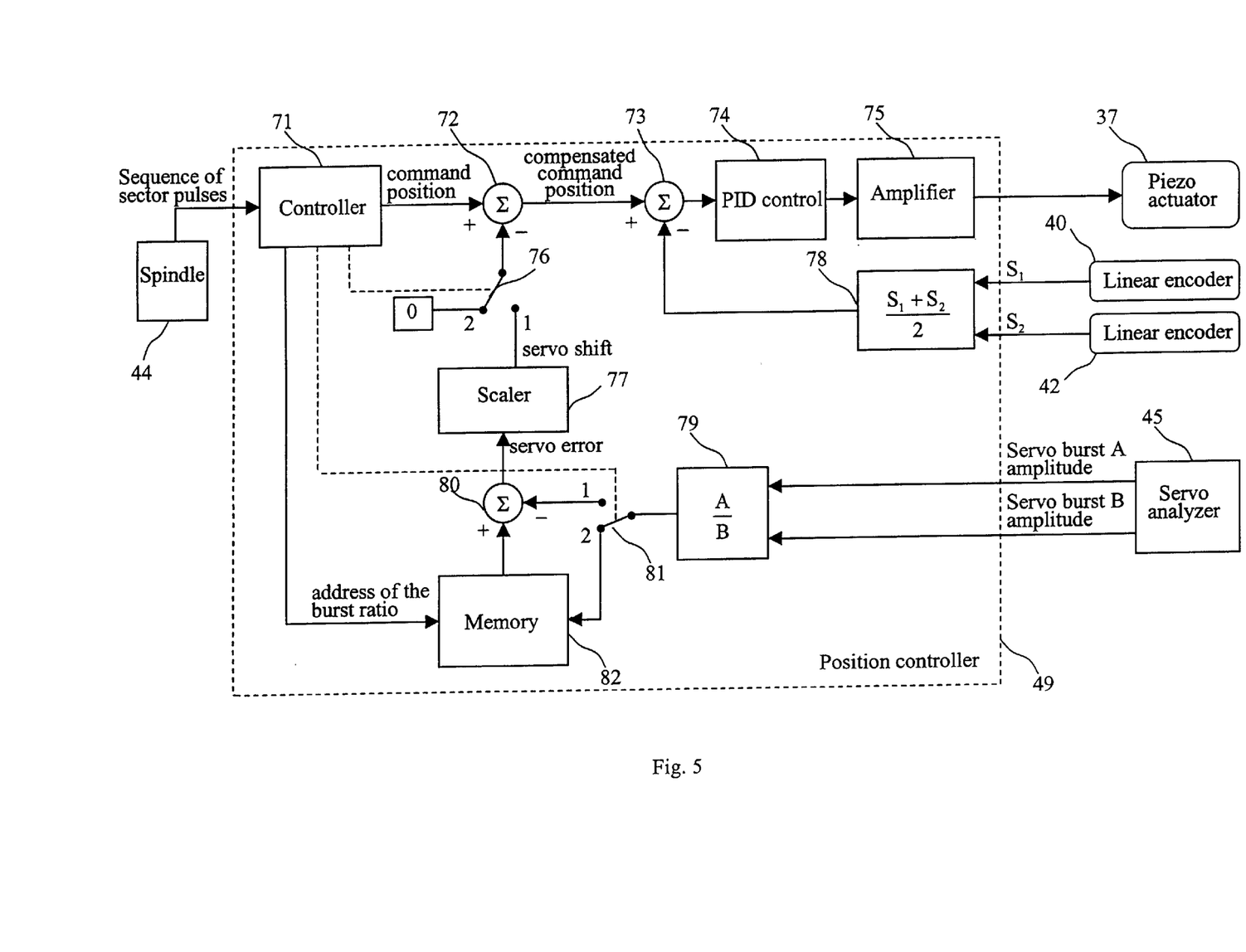
FIG. 5 is a functional block diagram of the position controller.

During a test, the head 34 is typically required to move to different (radial) offsets with respect to a track center line. The position controller 49 (shown in FIG. 5), is used to perform these positioning operations. Controller 49 includes controller 71, three adders 72, 73 and 80, proportional-integral-derivative (PID) closed-loop control unit 74, amplifier 75, position averager 78, divider 79, memory 82, scaler 77, and two switches 76 and 81. During any movement to a prescribed offset (command position), the controller 71 moves the switches 76 and 81 to the position 2, as shown in FIG. 5. In this position of the switches 76 and 81, one of the inputs of the adder 72 is zero, and therefore the command position equals the compensated command position. This means that the servo burst feedback is disabled. The feedback signals $S_1$ and $S_2$ from the linear encoders 40 and 42 are used in order to move the head 34 to the command position. The values of the feedback signals $S_1$ and $S_2$ that reflect current positions of linear encoders are averaged in the position averager 78. The result, (S1+S2)/2, is subtracted from the command position in the adder 73. The difference between the current position and the command position (positioning error) is processed by the PID control unit 74 in order to modify the control signal that goes through the amplifier 75 to the piezo actuator 37. As a result of the PID control, positioning error becomes very small. For a typical offset operation, the movement is completed in less than 10 milliseconds. The temperature drift in such a short time is negligible.

When the positioning error goes to zero, the controller 71 saves the ratios of the amplitudes for the servo bursts A and B (calculated by the divider 79) into an array of the memory 82 for all sectors. This array is dedicated to the prescribed command position. When all burst ratios are saved the controller 71 moves the switches 76 and 81 to the position 1, thus enabling servo burst feedback. The subsequent servo control operations are as follows:

For each sector, the controller 71 outputs the memory address corresponding to the prescribed command position and to this sector. The adder 80 subtracts the current ratio of the amplitudes for the servo burst A and B (calculated by the divider 79) from the ratio saved in the memory 82. The result ("servo error") is multiplied by a servo control factor in the scaler 77. The servo control factor depends on the characteristics of the head 34 and the magnetic disk 31. It is determined through a simple calibration procedure for the particular type of the head and the magnetic disk. This calibration does not have to be repeated each time a head or magnetic disk is changed. Output signal ("servo shift") of the scaler 77 is input to the adder 72, which in turn subtracts the servo shift from the command position. Since the input of the adder 72 is non-zero, the compensated command position is different from the actual command position, and the difference is equal to the compensation that is required in order to move the head back to the prescribed offset from the track center. PID control unit modifies the control signal that is applied through the amplifier 75 to the piezo actuator 37 in order to move the head 34 back to the prescribed offset from the track center. As a result the ratio of the servo bursts A and B is kept constant.

It is important to note that while servo burst feedback is enabled, feedback from the linear encoders 40 and 42 is not disabled. Furthermore, the feedback from the linear encoders 40 and 42 is applied continuously while the feedback from the servo bursts is applied once in each sector after burst amplitudes are read.

If during the test the head is required to move to one of the offsets that was used previously, then the following scheme is used:

During movement to a previously used offset, the controller 71 disables the servo burst feedback, and uses feedback from the linear encoders 40 and 42 in order to move the head 34 to the required position as was described above. When the positioning error goes below a certain limit (e.g., 0.025 $\mu$m, or 1 $\mu$in), the controller 71 outputs the memory address corresponding to the prescribed command position for each sector. The controller 71 moves the switches 76 and 81 to the position 1, thus enabling servo burst feedback. The subsequent servo control operations are the same as described above for the case of moving to a new offset.

Figure 6:
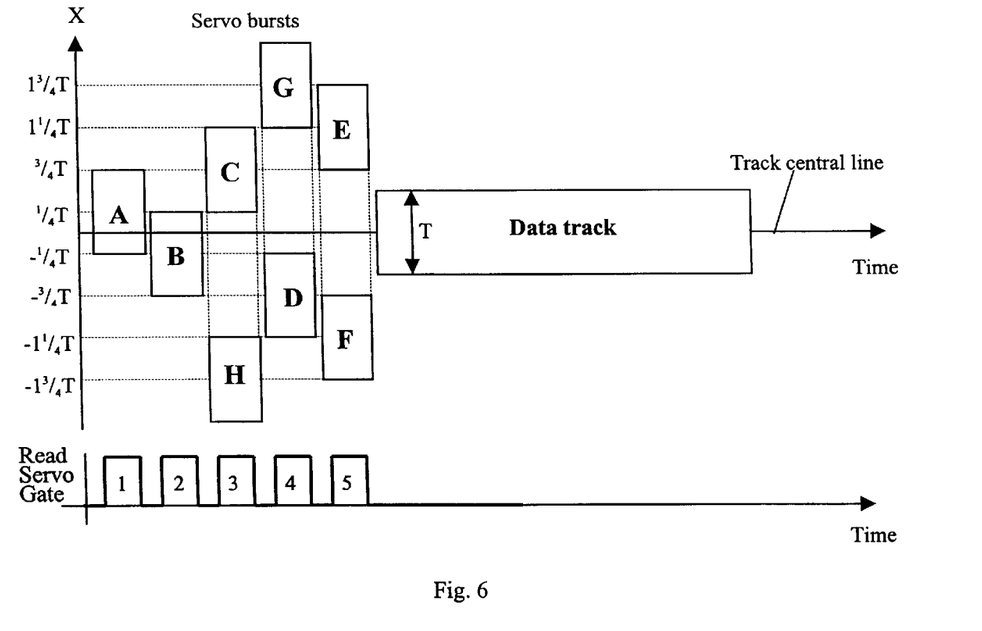
FIG. 6 is a timing diagram of the servo burst signals and data signals read from the magnetic disk, and a timing diagram of the read servo gate signal for a set of eight servo bursts.
Figure 7:
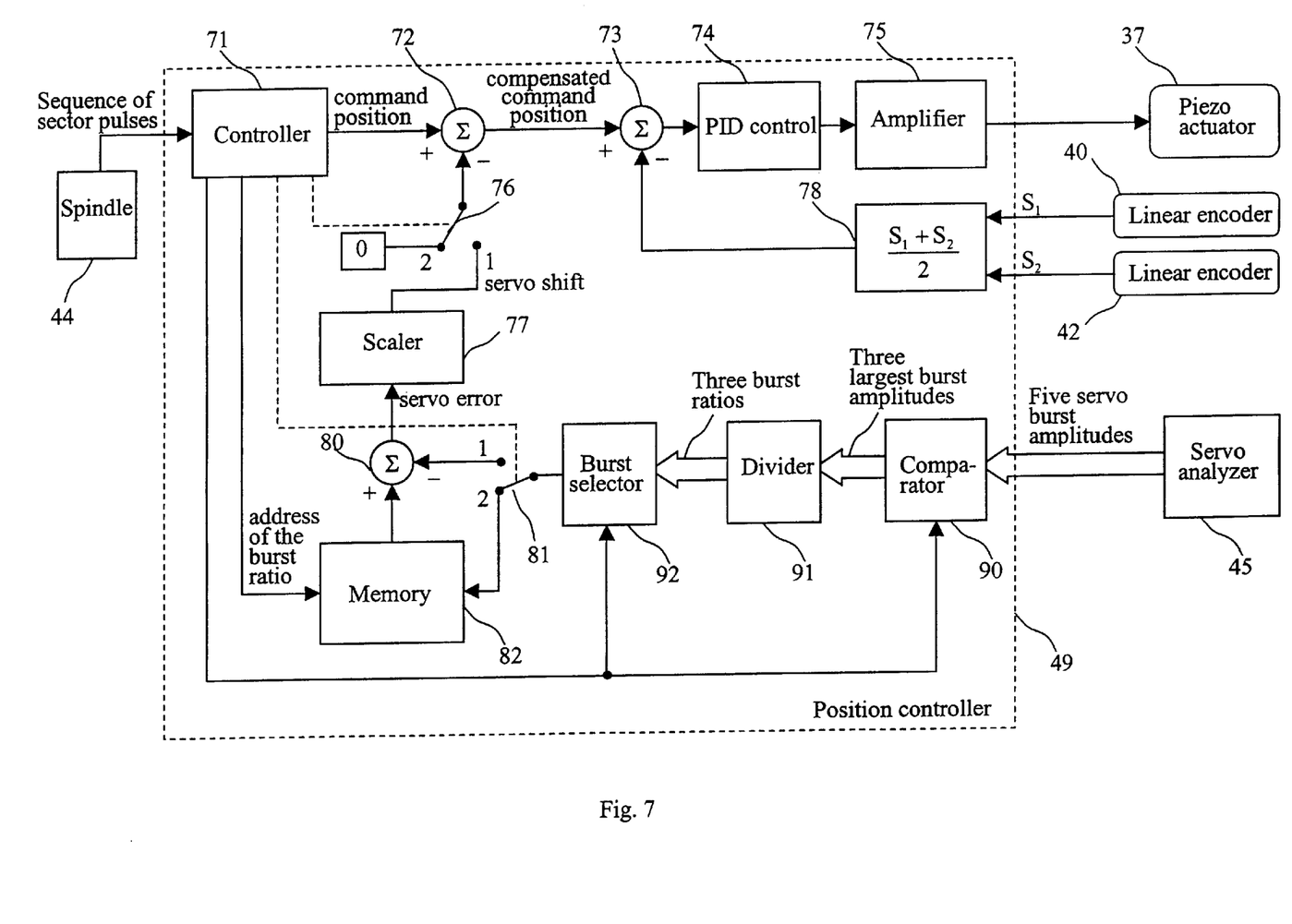
FIG. 7 is a functional block diagram of the position controller using a set of eight servo bursts.

In order to widen the range of the offsets that can be reached with the above-described positioning system, more bursts can be used instead of the two bursts shown in FIG. 3. An example with eight bursts is shown in FIG. 6. Read servo gate signal in this case consists of five pulses, as shown in FIG. 6. Five values of burst amplitudes, A, B, C (or H), D (or G), and E (or F), are transmitted from the output of the servo analyzer 45 to the input of the position controller 49. The functional diagram of position controller 49 in case of 8 bursts is shown in FIG. 7. FIG. 7 differs from FIG. 5 (the functional diagram of the position controller 49 in case of 2 bursts) in three additional blocks: a comparator 90, a divider 91, and a burst selector 92 that replace the divider 79.

If the magnetic head 34 moves to a new offset, the comparator 90 compares the amplitudes of the bursts A, B, C(or H), D(or G), and E (or F) and finds three bursts with maximum amplitudes $B_1 \leq B_2 \leq B_3$ for the very first sector after the point where the positioning error goes to zero. The divider 91 finds two ratios of the burst amplitudes, $B_1/B_2$ and $B_2/B_3$. The burst selector 92 selects two of the three bursts, $N^{(1)}$ and $N^{(2)}$, with the ratio that is the closest to 1 (since $B_1 \leq B_2 \leq B_3$, the third possible ratio $B_1/B_3$ is always larger than (or equal to) both $B_1/B_2$ and $B_2/B_3$). The numbers $N^{(1)}$ and $N^{(2)}$ and their burst ratio are saved by the controller 71 in an array of the memory 82. For all other sectors of the track, the controller 71 turns the comparator 90 off and locks the burst selector 92; so the burst selector 92 sends the ratio of the bursts $N^{(1)}$ and $N^{(2)}$ to the array of the memory 82. When all burst ratios are saved, the controller 71 moves the switches 76 and 81 to the position 1, thus enabling servo burst feedback. The bursts $N^{(1)}$ and $N^{(2)}$ are then used in subsequent servo control operations in the same way as described for 2-burst case.

If the magnetic head 34 moves to an offset that was used before, the controller 71 disables the servo burst feedback and uses feedback from the linear encoders 40 and 42 in order to move the head 34 to the required position. When the positioning error goes below a certain limit (e.g., 0.025 $\mu$m, or 1 $\mu$in), the controller 71 reads from the memory 82 the numbers $N^{(1)}$ and $N^{(2)}$ of the bursts that should be used for the prescribed command position. Then it disables the comparator 90 and locks the burst selector 92 in order to use ratio of the bursts $N^{(1)}$ and $N^{(2)}$. After that, the controller 71 outputs the memory address corresponding to the prescribed command position for each sector. The controller 71 moves the switches 76 and 81 to the position 1, thus enabling servo burst feedback. The subsequent servo control operations are the same as described for 2-burst case.

The burst set shown in FIG. 6 ensures the range of possible offsets between $-1\frac{3}{4}T$ and $+1\frac{3}{4}T$, where T is the write-width of the magnetic head 34. Since centers of the burst written at different offsets in the same time (see FIG. 6) are separated by $2\frac{1}{2}T$, they do not affect each other, and only one of them (e.g., C or H) is used for each offset. The above-described procedure of burst selection leads to the selection of a burst pair with the ratio in the range [$\frac{1}{2}$, 1]. This ensures that the amplitudes of bursts are neither close to the noise level, nor too large. In this region, the sensitivity of the burst amplitude ratio with respect to offset is high. As a result, the quality of the servo burst feedback and thus the repeatability of the head positioning increases.

Although the invention has been shown and described with reference to specific examples, it is understood that these examples do not limit the field of application of the invention and that any modification and change is possible within the limits of the appended claims. For example, although the head/disk tester was described in connection with magnetic head testing, the same head/disk tester and the same positioning system are applicable for testing magnetic heads of a head stack. The above-described servo control method can be used to compensate temperature drift in magnetic head/disk testers of any type. Any number of bursts and any arrangement of these bursts can be used instead of the ones shown in FIG. 3 or in FIG. 6.

What is claimed:

1. A head/disk tester having a thermal drift-compensated closed-loop positioning system for positioning a magnetic head at a desired offset with respect to a data track on a magnetic disk disposed about a disk axis, said data track extending along a circular track center line (TCL) on said magnetic disk disposed about said disk axis, comprising:

A. a base;

B. a spindle attached to said base, said spindle being adapted for rotatingly supporting a magnetic disk about said disk axis;

C. a movable carriage supported by said base, said carriage having an assembly for supporting a magnetic head in a region overlying said magnetic disk, said magnetic head having a read element and a write element;

D. positioning means for moving said carriage with said magnetic head with respect to said magnetic disk in a direction transverse to said disk axis;

E. a first feedback means for determining the position of said magnetic head with respect to said data track of said magnetic disk in stable temperature conditions;

F. a second feedback means for determining the position of said magnetic head with respect to said data track of said magnetic disk in varying temperature conditions, said second feedback means being responsive to servo burst signals on said magnetic disk at predetermined positions radially offset from said track center line; and G. a closed-loop positioner responsive to said first feedback means and said second feedback means to control said positioning means whereby said magnetic head is substantially at said desired offset from said track center line.

2. The head/disk tester of claim 1, wherein said positioning means includes: a plurality of motors for effecting open-loop positioning of said magnetic head to a nominal location with respect to said track center line, and at least one piezo actuator for effecting closed-loop positioning of said head.

3. The head/disk tester of claim 1, wherein said first feedback means includes at least one linear encoder for sensing position of said carriage with respect to said base along the direction of movement of said carriage.

4. The head/disk tester of claim 1, wherein said second feedback means includes a detector that detects the amplitudes of said servo burst signals prewritten on said magnetic disk.

5. The head/disk tester of claim 4, wherein said second feedback means further includes an averager that samples of the amplitudes of said detected servo burst signals and determines an average of said prewritten burst signals.

6. The head/disk tester of claim 4, further comprising means for prewriting said servo burst signals at a plurality of positions along a track of said magnetic disk, and for detecting the amplitudes of said prewritten burst signals.

7. The head/disk tester of claim 4, further comprising means for pre-writing said servo burst signals at a plurality of offsets from the center of a track of said magnetic disk, and for detecting the amplitudes of said prewritten burst signals.

8. The head/disk tester of claim 1, wherein said closed-loop positioner includes a proportional-integral-derivative (PID) control loop, a divider that determines ratios of averaged amplitudes of said servo burst signals, a memory that stores said ratios corresponding to prescribed head positions, and an additional servo loop that modifies command position of said PID control loop according to the changes of said ratios.

9. The head/disk tester of claim 8, wherein said additional servo loop is inoperative during a movement of said magnetic head to a prescribed location, and operative after said movement is completed.

10. A method of positioning of a magnetic head/disk tester, wherein at least two servo burst signals are prewritten to a magnetic disk with a magnetic head at a plurality of offsets from the center line of a data track on said magnetic disk before the beginning of a test of said magnetic head, said method comprising the steps of:

A. moving said magnetic head from one location over said magnetic disk to another location with a closed loop positioner that uses a first feedback source, wherein said first feedback source reflects the position of said magnetic head with respect to said magnetic disk, said position being in a wide range including a substantial portion of the whole width of said magnetic disk; and B. adjusting the position of said magnetic head at a prescribed location over said magnetic disk using an additional closed loop responsive to a second feedback source, said second feedback source being prewritten set of servo burst signals stored on said magnetic disk at locations laterally offset from said centerline, wherein said second feedback source reflects the local position of said magnetic head with respect to said magnetic disk in a relatively narrow vicinity of said data track of said magnetic disk.

11. The method of claim 10, wherein a ratio of servo burst signals is used to determine the position of the said magnetic head with respect to said magnetic disk.

12. The method of claim 11, wherein said servo burst signals are prewritten at a plurality of positions along a track of said magnetic disk.

13. The method of claim 11, wherein a plurality of servo burst signals are prewritten at different offsets from the center of a track of said magnetic disk, thereby effecting a relatively wide operative range of said second feedback source.

14. The method of claim 13, including the further step of choosing the bursts to be used with said second feedback source using the substeps of:

i. selecting three burst signals, $B_1 \leq B_2 \leq B_3$, with maximum amplitudes;

ii. calculating ratios $B_1/B_2$ and $B_2/B_3$;

iii. selecting the two bursts that correspond to the ratio that is the closest to 1.

15. The method of claim 11, wherein narrow band-pass filtering and/or averaging effects relatively high noise immunity for said second feedback source.

16. The method of claim 11, wherein said burst ratios are stored in a memory and are subsequently read from said memory, and used to control movement of said magnetic head to a predetermined prior location.

17. System for generating and storing signals for positioning a magnetic read/write head with respect to a data track on a magnetic disk, said data track having width T and extending along a circular track center line disposed about a disk axis, comprising:

A. a base,

B. a disk support assembly affixed to said base for rotatably supporting said magnetic disk about said disk axis, C. a head support assembly affixed to said base, including a magnetic read/write head, said read/write head having a write width T, and including an associated positioning assembly for selectively positioning said head to a nominal locations with respect to said track center line, D. a controller for successively positioning said read/write head to one or more positions characterized by an associated desired offset with respect to said track center line, including:

i. means for writing in a time succession as said disk rotates two or more servo bursts over a relatively short time, wherein each of said bursts is laterally offset from said track center line by a predetermined distance, and ii. means for reading said servo bursts at each of said offsets, and generating and storing signals representative of each read burst associated with each of said offsets.

18. System according to claim 17, further comprising:

means responsive to an applied desired offset signal to retrieve said stored signal associated with said offset, and applying said retrieved signals to said controller to position said magnetic read/write head in a closed loop manner in accordance with said retrieved signals.

19. Method for positioning a magnetic read/write head with respect to a data track on a magnetic disk, said read/write head having a write width T, and said data track having width T and extending along a circular track center line disposed about a disk axis, comprising the steps of:

A. writing in a time succession as said disk rotates, two or more servo bursts on said disk over a relatively short period of time, wherein each of said bursts is written at locations laterally offset from said track center line by a predetermined distance, B. positioning said read/write head to a plurality of desired offsets with respect to said track center line, and at each of said offsets, reading said servo bursts in succession and determining an amplitude value representative of said bursts at each of said desired offsets, C. storing said amplitude values in connection with said respective ones of desired offsets, and D. in a closed loop manner, using the respective ones of said stored values to reposition said magnetic read/write head to selected ones at said desired offsets.

* * * * *